United States Patent [19]

Stoklosa

[11] Patent Number: 5,047,068
[45] Date of Patent: Sep. 10, 1991

[54] PROCESS OF ASSEMBLING A CELL

[75] Inventor: David P. Stoklosa, Webster, N.Y.

[73] Assignee: Eveready Battery Company, Inc., St. Louis, Mo.

[21] Appl. No.: 415,915

[22] Filed: Oct. 2, 1989

[51] Int. Cl.⁵ .............................................. H01M 6/00
[52] U.S. Cl. .................... 29/623.2; 29/730; 429/66; 429/94
[58] Field of Search .................. 429/66, 94; 29/623.2, 29/623.1, 730

[56] References Cited

U.S. PATENT DOCUMENTS

| | | | |
|---|---|---|---|
| 3,245,837 | 4/1966 | Ikeda et al. | 429/94 X |
| 3,796,606 | 3/1974 | Lehmann et al. | 429/94 |
| 3,985,573 | 10/1976 | Johnson et al. | 429/133 |
| 4,032,696 | 6/1977 | Urry | 429/101 |
| 4,048,389 | 9/1977 | Bubnick et al. | 429/164 X |
| 4,663,247 | 5/1987 | Smilanich et al. | 429/94 |

Primary Examiner—Anthony Skapars
Attorney, Agent, or Firm—Robert W. Welsh

[57] ABSTRACT

The invention relates to a spring for maintaining a low internal resistance in a cell employing a consumable electrode, the cell employing such a spring and the method of manufacturing a cell employing such a spring. The spring fits within one electrode and its expansion keeps the cell electrodes close together as one is depleted. The spring has turned-in edges which enable it to be wrapped about and held by a split mandrel. A cell electrode can then be wrapped about the spring and the composite inserted into the cell container. The spring and electrode can be pushed off of the mandrel releasing the spring and forcing the electrode material into close contact with a separator and second electrode.

7 Claims, 2 Drawing Sheets

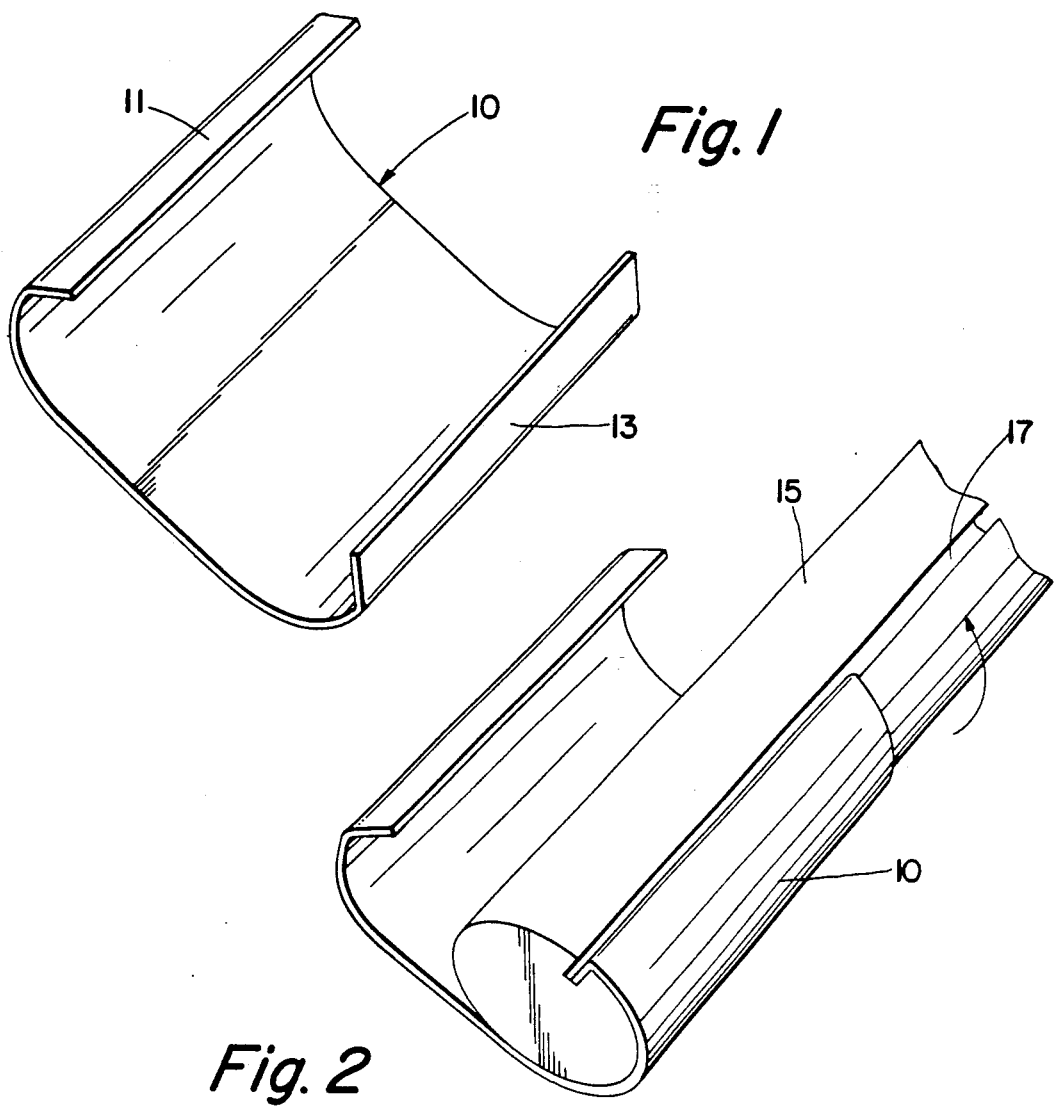
Fig. 1
Fig. 2
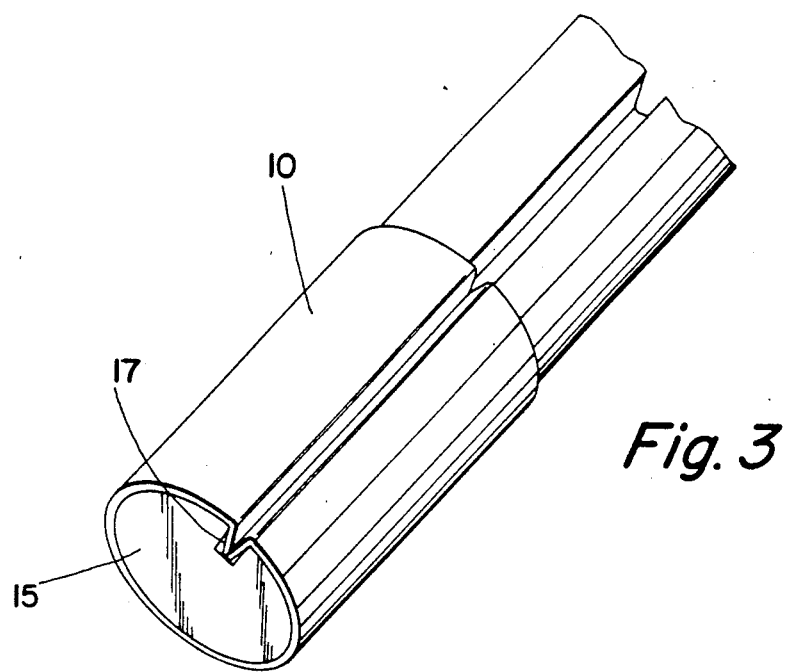
Fig. 3

PROCESS OF ASSEMBLING A CELL

BACKGROUND OF THE INVENTION

The present invention relates to an improved, high energy storage cell.

Over the past several years, considerable effort has been expended to improve storage cells or batteries for use in numerous electronic devices. The energy content of each cell has been substantially increased so that the battery has a longer useful life and, in turn, needs to be replaced less frequently. Examples of the improved storage cells to which the present invention relates are shown in U.S. Pat. No. 3,985,573, issued Oct. 12, 1976, and U.S. Pat. No. 4,032,696, issued June 28, 1977, both of which are assigned to the assignee of the present application, and are incorporated herein by reference in their entirety. Both of these patents disclose bobbin-type liquid cathode cells using an alkali metal electrode, such as lithium, sodium or calcium with lithium being the preferred material. The storage cells also employ a powdered carbon electrode which may or may not be held together by a suitable binder. A nonaqueous cathode material such as thionyl chloride is used in the cell to facilitate the electrochemical reaction.

In the bobbin cells of the type described in each of the above patents, the metal electrode is consumed in the course of the electrochemical process. The cell is usually assembled with one of the electrodes contacting the inner wall of the container forming the outer shell of the battery and with a separator between this electrode and the other electrode. Lithium is used to form the anode of the cell and can be positioned as either the inner or outer electrode. As the electrochemical process takes place, the lithium electrode is consumed and the spacing between the electrodes will gradually increase, thereby increasing the internal cell resistance of the cell and, in turn, lowering the energy output of the cell. In order to compensate for this change in the physical dimensions of the cell in the course of the electrochemical process, the '573 patent employed a resilient, cylindrical cathode collector which could be compressed for insertion into the cell. The cathode collector would expand after insertion and continue to expand, maintaining pressure on the separator and the lithium electrode during the course of the electrochemical process. The '696 patent, on the other hand, placed the carbon electrode against the container wall lined with a separator. The lithium electrode was then added in segments to the center of the cell and was placed under spring pressure forcing the segmented lithium against the separator and carbon electrode during the course of the electrochemical process. Each of these cells were successful high energy cells.

Another patent of interest to the present invention is U.S. Pat. No. 3,796,606, issued Mar. 12, 1974, to G. Lehmann et al which is also incorporated herein by reference. In the bobbin cell disclosed in this patent, a first electrode material is placed against the inner wall of the container which forms one external terminal of the cell. A separator then lines the exposed surface of the first electrode. A sheet of lithium is then welded to the surface of a cylindrical spring. The composite spring/lithium metal is then compressed and inserted into the center of the cell. The spring is then released and allowed to expand, pressing the lithium electrode against the separator. The pressure would be maintained throughout the course of the electrochemical reaction as the lithium is depleted.

In each of the above cells, a means is provided for maintaining pressure on the electrodes during the course of the electrochemical reaction. Each of the cells, however, presented difficulties during the manufacturing process. In the '573 patent, the resilient carbon cathode collector had to be compressed in order to be inserted into the partially completed battery. In the '696 patent, the segmented lithium electrode reduced the lithium content of the battery and, in turn, the energy content and, also, presented difficulties in manufacturing because of having to handle the segmented electrode along with a spring. In the '606 patent, a cylindrical spring was used. However, it was difficult to contain the spring as a smooth cylinder was presented with no way to grip the edges in the course of the battery assembly process. For example, if the spring were grasped at the top to hold it in position, the bottom would have a tendency to spread open, inhibiting the entrance of the composite spring/lithium metal electrode into the battery. Even if an insertion tool, e.g., an insertion die, were used to assist in inserting the composite spring/lithium metal member, two problems would occur: (1) the lithium would tend to gall and to adhere to the tool, and (2) in order to provide adequate clearance during insertion for the tool between the cell separator and the composite spring/lithium metal member, the diameter of the composite member would have to be excessively reduced such that its ultimate spring recovery would be impeded.

SUMMARY OF THE INVENTION

In accordance with the present invention, an improved cylindrical spring is provided having means to control the entire spring surface. The longitudinally split cylindrical spring has turned in edges or flanges which can easily be gripped and held by a split mandrel which is used during the battery assembly process. The electrode material, e.g., lithium metal, is wrapped about the surface of the compressed spring with the edges of the lithium aligned with the edges of the spring. A full lithium electrode can be used substantially increasing the surface area of the lithium rather than an electrode made of segmented pieces or a thin sheet of lithium welded to a split cylindrical spring. Through the use of the improved spring, a higher energy density bobbin-type liquid cathode battery is produced and the battery assembly process is substantially improved. A further advantage is the uniform radial pressure provided by the split cylindrical spring.

The invention, together with additional advantages thereof, will best be understood by reference to the following detailed description when considered together with accompanied drawings which are set forth as being exemplary of embodiments of the present invention and are not intended, in any way, to be limitative thereof.

BRIEF DESCRIPTION OF THE DRAWINGS

FIG. 1 is a perspective view of the electrode spring showing the edges turned in;

FIG. 2 is a perspective view of the electrode spring being wrapped about a mandrel;

FIG. 3 is a perspective view showing the spring wrapped about and held in place by the mandrel;

DESCRIPTION OF THE PREFERRED EMBODIMENTS

Referring to FIG. 1, an open sheet of spring material is shown and indicated generally by the number 10. The spring is of substantially rectangular configuration and has turned in edges or flanges 11 and 13 bent at an angle of approximately 90° relative to the flat central portion of the spring. The spring can be made of any material compatible with the components of the battery. Metals such as spring steel, stainless steel and other alloys can be used. Nonmetallic materials such as plastics, carbon/resin composites, and the like which possess the desired resiliency may also be used. The preferred metal material is a half-hardened 301 stainless steel because of its superior yield strength. The spring material is cut to fit whatever size cell is being assembled. For example, a D cell would use a sheet approximately 2.25 inches in length and 1.25 inch in height. The effective thickness of the sheet material is not critical, so long as the sheet material is strong enough to apply adequate pressure to the interior of the cell throughout the cell life yet not reduce substantially the active material volume of the cell.

Figure 4:
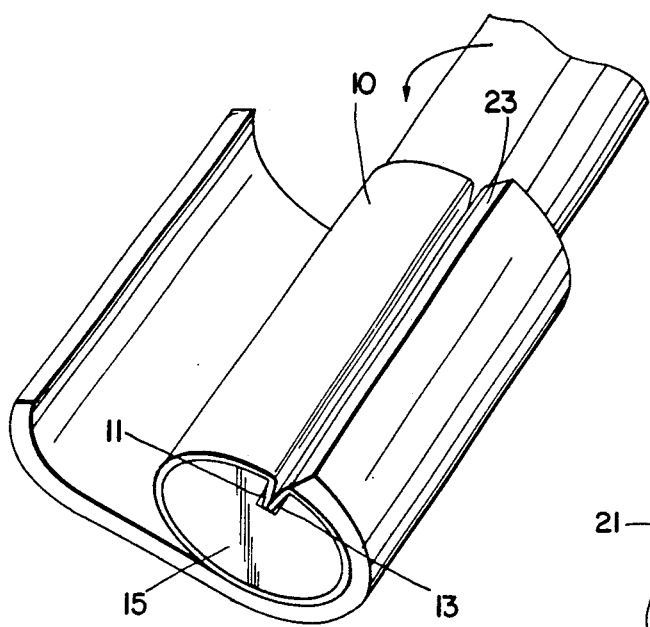
FIG. 4 is a perspective view showing an electrode material being wrapped about the spring.
Figure 5:
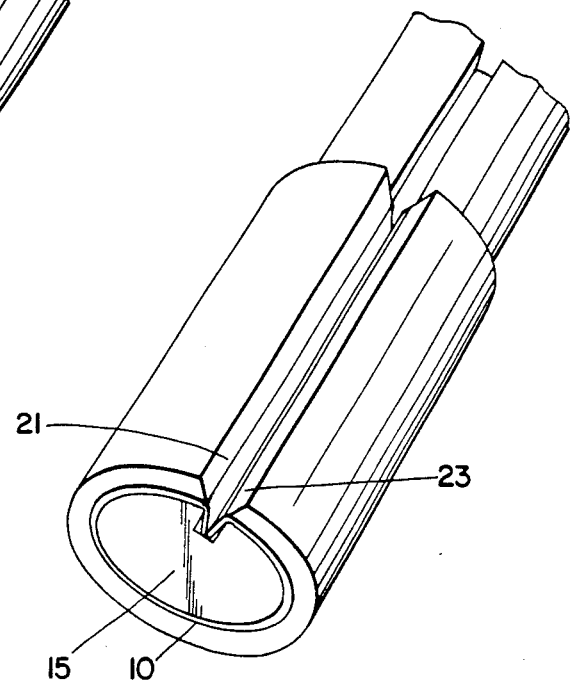
FIG. 5 is a perspective view of the end of the mandrel showing the spring and electrode material.

In the process of assembling a cell, using the electrode spring 10, referring to FIG. 2, a mandrel 15 is employed having a slot 17 into which one of the turned edges of the electrode spring is inserted. The slot is radially oriented in the mandrel and is of a width somewhat greater than the combined thickness of the spring flanges to receive and retain them due to the pressure applied to the flanges by the curved spring. The mandrel can then be rolled along the spring material until the second turned in edge is reached, at which time the edge can be inserted into the slot 17 abutting the first turned in edge. As shown in FIG. 3, the mandrel 15 can hold in place both edges of the spring 10 which are inwardly directed and bind against each other to hold the edges in the slot and in turn to hold the spring tightly wrapped about the periphery of the mandrel. The mandrel 15 can be made of metal, plastic, or wood, preferably metal. After the spring is wrapped about the mandrel, the mandrel and spring are then used, as in FIG. 4, as a form about which the electrode material 19 is shaped. In the preferred embodiment, the lithium metal electrode is wrapped about the mandrel and spring with the opposed edges 21 and 23 aligned with the Opposed edges 11 and 13 of the electrode spring.

Figure 7:
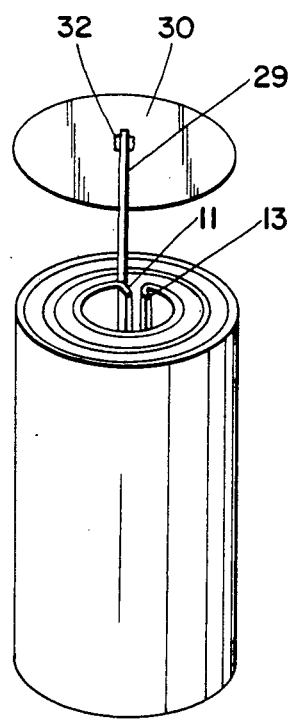
FIG. 7 is a perspective view of an assembled cell showing an electrode tab attached to the spring.
Figure 6:
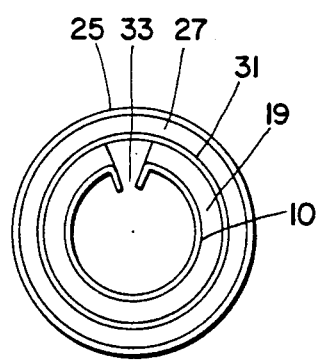
FIG. 6 is a sectional view of an assembled cell incorporating the spring of the present invention.

After the lithium metal is wrapped about the spring on the mandrel, the combination can be inserted into the cell container already containing an electrode and separator. As shown in FIG. 6, the container 25 would already have therein a porous carbon electrode 27 which was injected or dry rammed into the container in tight contact with the container's inner wall. A conventional separator 31 would also be included in the container in contact with the electrode to isolate the lithium electrode material 19 from the carbon electrode and the bottom of the can. After the mandrel and spring electrode material composite is inserted into the prepared cell container, a stripping ring can be slipped down the mandrel to slide the composite off of the mandrel, releasing the spring, causing it to open, pressing the lithium electrode material against the separator. There are many methods of connecting the spring/electrode material composite to the cell cover or a portion thereof, which serves as the second external terminal of the completed cell. In one method, as shown in FIG. 7, a conductive lead or tab 29, such as nickel, can be fastened to either one of edges 11 and 13. Tab 29 is then fastened to a suitable cover 30 or a portion thereof, for example, by spot weld 32 or by pressure contact means. In assembling the cell, the cover 30 or a portion thereof is obviously insulated from the container 25 which forms the first external terminal of the cell. Another suitable means of connection is the telescopic terminal tab of U.S. Pat. No. 4,794,056. In instances where the spring material is electrically nonconductive, contact can be made from the active electrode material to the second external terminal of the cell.

While a split mandrel is the preferred tool for use in assembling a cell employing the flanged spring, other tools can be used or designed for use in holding the edges of the compressed spring. The flanged spring provides a gripping surface for all such tools.

Before sealing the cell, the void space within the cell is substantially filled with an electrolyte or preferably a nonaqueous cathode-electrolyte (catholyte) material such as thionyl chloride containing an alkali or alkaline earth metal salt as the solute. Examples of other suitable electrolyte materials and additives are fully disclosed in the three patents discussed in the "BACKGROUND OF THE INVENTION".

It can be seen in FIG. 6, that in assembling the cell, the lithium layer is aligned with the turned-in edges of the spring 10. As the lithium is consumed in the course of the discharge of the cell, the spring 10 will maintain pressure against the inner surface of the lithium and the gap 33 will slowly expand. When the cell is initially assembled, the turned-in edges 11 and 13 are in contact and, if made long enough, will remain in contact even as the gap 33 begins to open. The edges 21 and 23 of the lithium electrode material are preferably aligned with edges 11 and 13 of the electrode spring so as to not interfere with the opening of the spring. As is well known, a nonaqueous electrolyte fills the center of the cell and the pores in the separator 31. As was pointed out above and repeated here for emphasis, through the use of the spring 10, a larger amount of lithium can be incorporated in the cell thereby increasing the total discharge capacity of the cell.

Though the invention has been described with respect to a specific preferred embodiment thereof, many variations and modifications will become apparent to those skilled in the art. It is therefore the intention that the appended claims will be interpreted as broadly as possible in view of the prior art to include all such variations and modifications.

The embodiments of the invention in which an exclusive property or privilege is claimed are defined as follows.

1. A method of making a cell comprising the following steps:
   providing a metal container for the cell and for forming a first electrical terminal;
   forming a first cell electrode within and in contact with said container;
   providing a separator for electrically insulating said first cell electrode;

forming a substantially rectangular sheet of spring material having opposed edges bent in the same direction into a compressed longitudinally split cylindrical shape;

wrapping a sheet of electrode material over said sheet of compressed spring material;

inserting said electrode material wrapped spring into the area of said container bounded by said separator;

releasing said spring to enable said spring to press said electrode material against said separator;

attaching a contact to said electrode material and to a cover for said container to form a second terminal for said battery;

adding an electrolyte solution to said container; and closing said container with said cover to form a complete cell.

2. The method of making a cell as set forth in claim 1 wherein the sheet of spring material is metal.

3. The method of making a cell as set forth in claim 1 wherein the sheet of spring material is steel.

4. A method of making a battery as set forth in claim 1 wherein the sheet of spring material is stainless steel.

5. A method of making a cell as set forth in claim 1 wherein the edges of said sheet of electrode material are aligned with the edges of said wrapped sheet of spring material.

6. A method of making a cell as set forth in claim 1 wherein the sheet of spring material is formed about a split mandrel by placing a first turned-in edge into the split and wrapping said sheet about said mandrel until the second edge can be inserted into and held by said split in contact with said first edge, followed by wrapping a sheet of electrode material over said sheet of spring material on said mandrel;

inserting said mandrel and electrode material wrapped spring into the area of said container bounded by said separator; and sliding said wrapped sheets of spring material and electrode material off of said mandrel while in said container.

7. A method of making a cell as set forth in claim 6 wherein the edges of said sheet of electrode material are aligned with the edges of said wrapped sheet of spring material.

* * * * *